United States Patent
Sung et al.

(10) Patent No.: US 8,259,233 B2
(45) Date of Patent: Sep. 4, 2012

(54) SYSTEM AND METHOD FOR PROCESSING A TELEVISION PICTURE-OUT-PICTURE

(75) Inventors: Yu-Yu Sung, Cyonglin Township, Hsinchu County (TW); Chang-Sheng Chen, Hsinchu (TW); Chiung-Sui Liu, Yongkang (TW)

(73) Assignee: Sunplus Technology Co., Ltd, Hsinchu (TW)

( * ) Notice: Subject to any disclaimer, the term of this patent is extended or adjusted under 35 U.S.C. 154(b) by 823 days.

(21) Appl. No.: 12/285,720

(22) Filed: Oct. 14, 2008

(65) Prior Publication Data
US 2009/0225224 A1  Sep. 10, 2009

(30) Foreign Application Priority Data

Mar. 7, 2008 (TW) .............................. 97107993 A

(51) Int. Cl.
*H04N 5/45* (2006.01)
*H04N 7/01* (2006.01)
*H04N 11/20* (2006.01)
*H04N 5/445* (2006.01)
*G09G 5/36* (2006.01)

(52) U.S. Cl. ......... 348/565; 348/452; 348/568; 345/558

(58) Field of Classification Search ........................ None
See application file for complete search history.

(56) References Cited

U.S. PATENT DOCUMENTS 5,459,528 A * 10/1995 Pettitt .......................... 348/568
7,830,449 B2 * 11/2010 Zhou et al. .................... 348/452
2005/0122341 A1 * 6/2005 MacInnis et al. ............. 345/558

FOREIGN PATENT DOCUMENTS

| CN | 1195374 C | 3/2005 |
| CN | 101090466 A | 12/2007 |
| TW | 200523819 A | 7/2005 |

OTHER PUBLICATIONS

Office Action issued on Aug. 25, 2011 in corresponding Taiwanese Application No. 097107993.

* cited by examiner

*Primary Examiner* — Jefferey Harold
*Assistant Examiner* — Sean Haiem
(74) *Attorney, Agent, or Firm* — Bacon & Thomas, PLLC

(57) ABSTRACT

A system for processing a television (TV) picture-out-picture (POP) includes a line buffer, a first multiplexer, an image processing engine, a scaling engine and a timing generator. The line buffer receives partial pixels of a first picture and partial pixels of a second picture. The first multiplexer selects the partial pixels of the first and second picture as an output. The image processing engine performs an image processing on the partial pixels output by the first multiplexer to thereby produce processed pixels. The scaling engine performs a scaling operation on the processed pixels to thereby produce scaled pixels. The timing generator produces a timing signal for the image processing engine and the scaling engine and produces enable signals respectively for the first picture and the second picture. The image processing engine and the scaling engine process the partial pixels of the first or second picture in multiplexing.

4 Claims, 5 Drawing Sheets

SYSTEM AND METHOD FOR PROCESSING A TELEVISION PICTURE-OUT-PICTURE

BACKGROUND OF THE INVENTION

1. Field of the Invention

The present invention relates to the technical field of image processing and, more particularly, to a system and method for processing a television (TV) picture-out-picture (POP).

2. Description of Related Art

The capability of displaying multiple pictures is generally provided to a high-definition TV to thereby increase the added value. The multiple pictures can be displayed as a picture-in-picture (PIP) or picture-out-picture (POP) type. For example, FIG. 1A is a schematic view of a typical PIP, and FIG. 1B is a schematic view of a typical POP. As shown in FIG. 1B, the POP has two pictures that are required to have the identical image quality and size, or almost the same. Accordingly, the hardware configuration for the POP is more complicated than that for the PIP.

A typical way uses two sets of hardware to decode the two pictures of the POP. FIG. 2 is a schematic diagram of a typical hardware configuration for performing a POP. The two pictures may be input by different image sources and have different sizes and formats. Accordingly, for achieving the identical output performance and size on the two pictures, the picture processors 210, 220 are independent, and also the scalers 230, 240 are independent for scaling the two pictures respectively, one for the main picture and the other for the sub-picture, thereby obtaining the POP capability.

FIG. 3 is a schematic diagram of a POP performed by a typical TV. The pictures A, B are different input images, with different video frame sizes and formats, and processed by the picture processors 210, 220 and the scalers 230, 240 to thereby produce the output pictures A', B' respectively. Further, the output pictures A', B' are combined by the image synthesizer 250 and output to a display panel for concurrent display. However, for implementing the POP capability, the chip with the above devices requires a large area, and the cost is relatively increased, resulting in lowering the competitiveness.

Therefore, it is desirable to provide an improved TV with the POP capability to mitigate and/or obviate the aforementioned problems.

SUMMARY OF THE INVENTION

The object of the present invention is to provide a system and method for processing a television (TV) picture-out-picture (POP), which requires only one set of image processing hardware for achieving the POP capability without reducing the frame rate on display and relatively saving the cost.

According to a feature of the invention, a system for processing a television (TV) picture-out-picture (POP) is provided, which includes a line buffer, a first multiplexer, an image processing engine, a scaling engine and a timing generator. The line buffer receives partial pixels of a first picture and partial pixels of a second picture for output. The first multiplexer has two input terminals connected to the line buffer in order to select the partial pixels of the first or second picture as an output. The image processing engine is connected to the first multiplexer in order to perform an image processing on the partial pixels output by the first multiplexer to thereby produce processed pixels corresponding to the partial pixels of the first or second picture. The scaling engine is connected to the image processing engine in order to perform a scaling operation on the processed pixels to thereby produce scaled pixels. The timing generator is connected to the first multiplexer, the image processing engine and the scaling engine in order to produce a timing signal for the image processing engine and the scaling engine and to produce enable signals respectively for the first picture and the second picture, wherein the image processing engine and the scaling engine process the partial pixels of the first picture or the partial pixels of the second picture in multiplexing.

According to another feature of the invention, a method for processing a television (TV) picture-out-picture (POP) is provided, which includes: (A) outputting an n-th line of data of a first picture at a first time; (B) outputting an n-th line of data of a second picture at a second time; (C) performing scaling operations on the n-th lines of data of the first and the second pictures to thereby produce scaled pixels corresponding to the n-th line of data of the first picture and scaled pixels corresponding to the n-th line of data of the second picture; and (D) synthesizing the scaled pixels of the first picture and the scaled pixels of the second picture to thereby produce a combined frame with the first and the second pictures.

Other objects, advantages, and novel features of the invention will become more apparent from the following detailed description when taken in conjunction with the accompanying drawings.

DETAILED DESCRIPTION OF THE PREFERRED EMBODIMENT

Figure 1A:
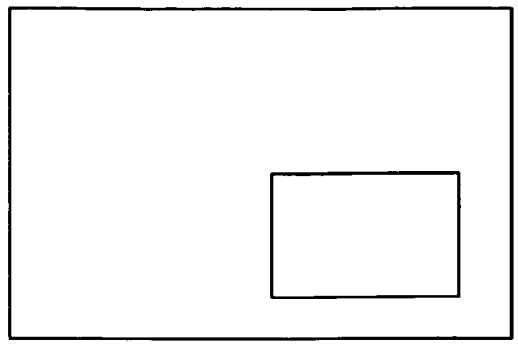
FIG. 1A is a schematic diagram of a typical picture-in-picture.
Figure 1B:
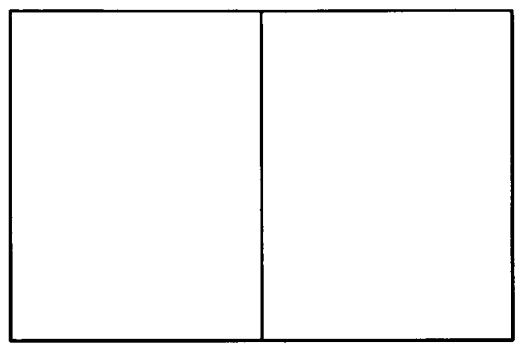
FIG. 1B shows a schematic diagram of a typical picture-out-picture.
Figure 2:
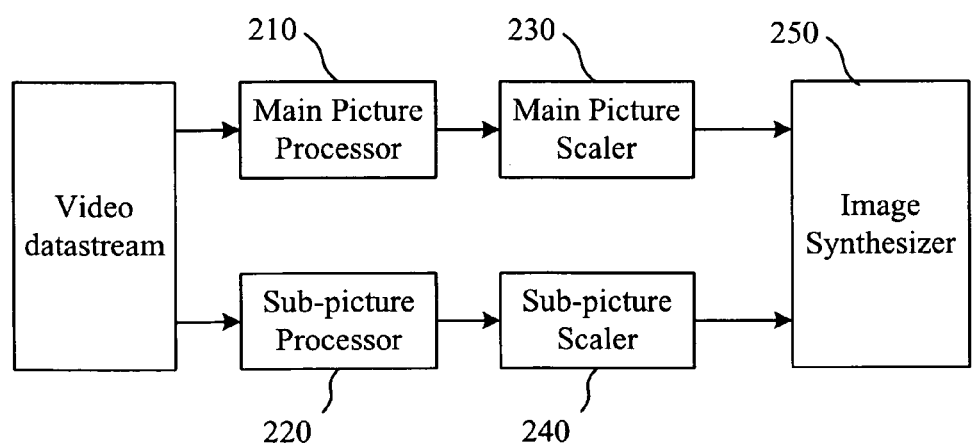
FIG. 2 is a schematic diagram of a typical hardware configuration for performing a picture-out-picture.
Figure 3:
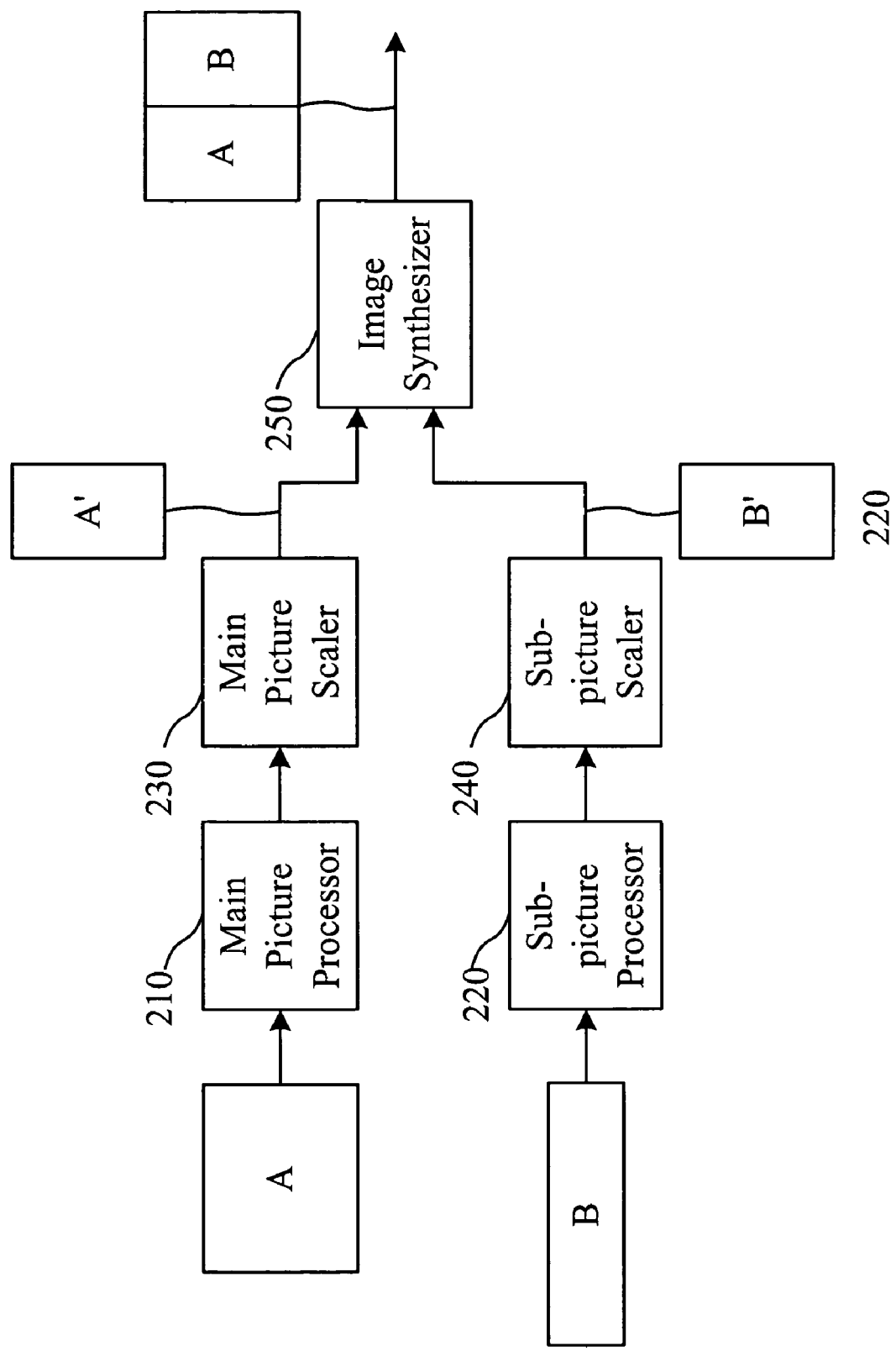
FIG. 3 is a schematic diagram of a picture-out-picture performed by a typical TV.
Figure 4:
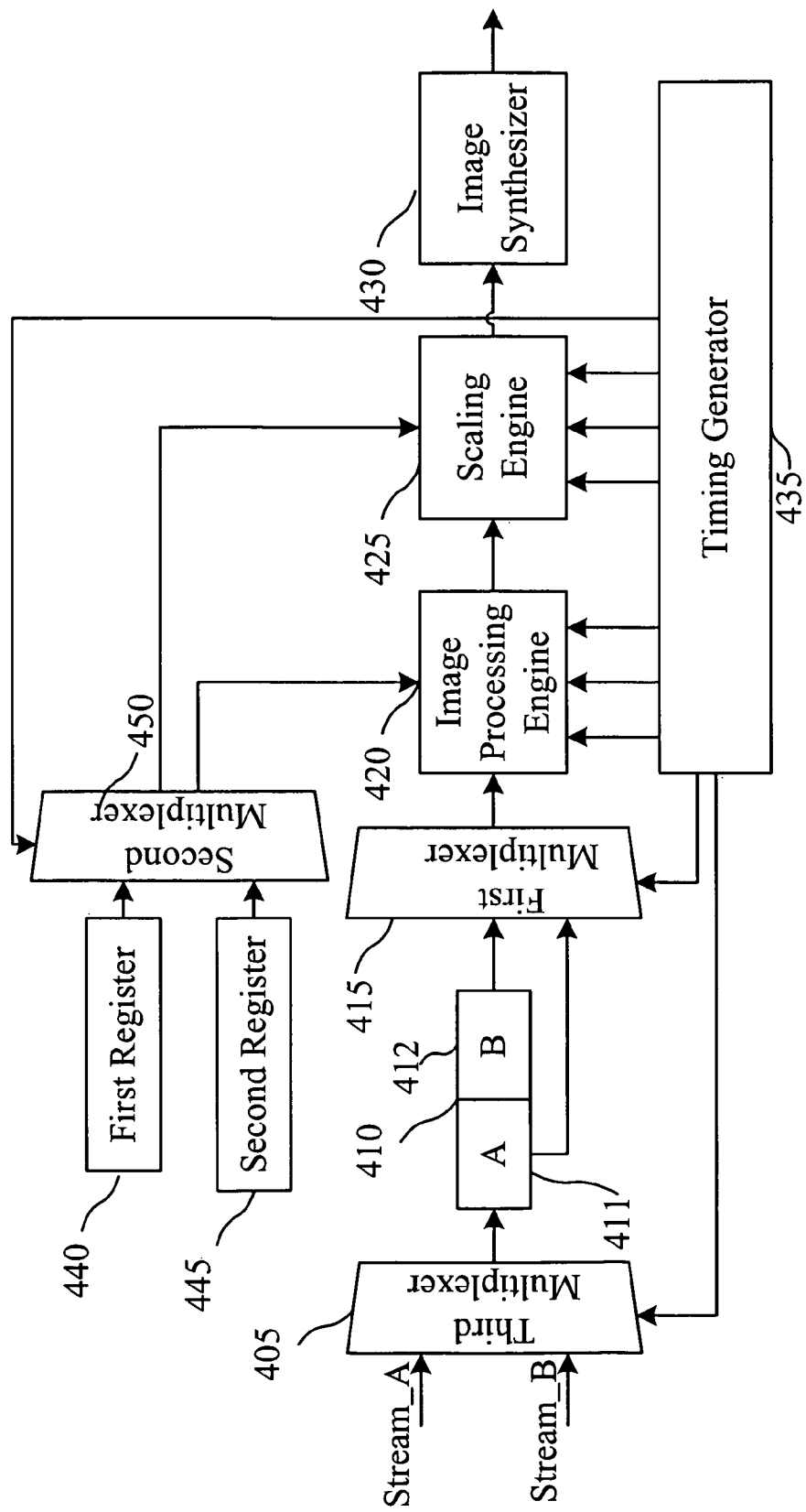
FIG. 4 is a block diagram of a system for processing a television picture-out-picture in accordance with the invention.

FIG. 4 is a block diagram of a system for processing a television picture-out-picture (POP) in accordance with the invention. In FIG. 4, the system includes a line buffer 410, a first multiplexer 415, an image processing engine 420, a scaling engine 425, a timing generator 435, an image synthesizer 430, a first register 440, a second register 445, a second multiplexer 450 and a third multiplexer 405.

The third multiplexer 405 is connected to the line buffer 410 in order to receive partial pixels of a first picture Stream_A and partial pixels of a second picture Stream_B and to send the partial pixels of the first and the second pictures Stream_A and Stream_B to the line buffer 410 in multiplexing.

The line buffer 410 is connected to the third multiplexer 405 in order to receive the partial pixels of the first and the second pictures and the line buffer 410 has two output terminals for outputting the partial pixels of the first and the second pictures.

Figure 5:
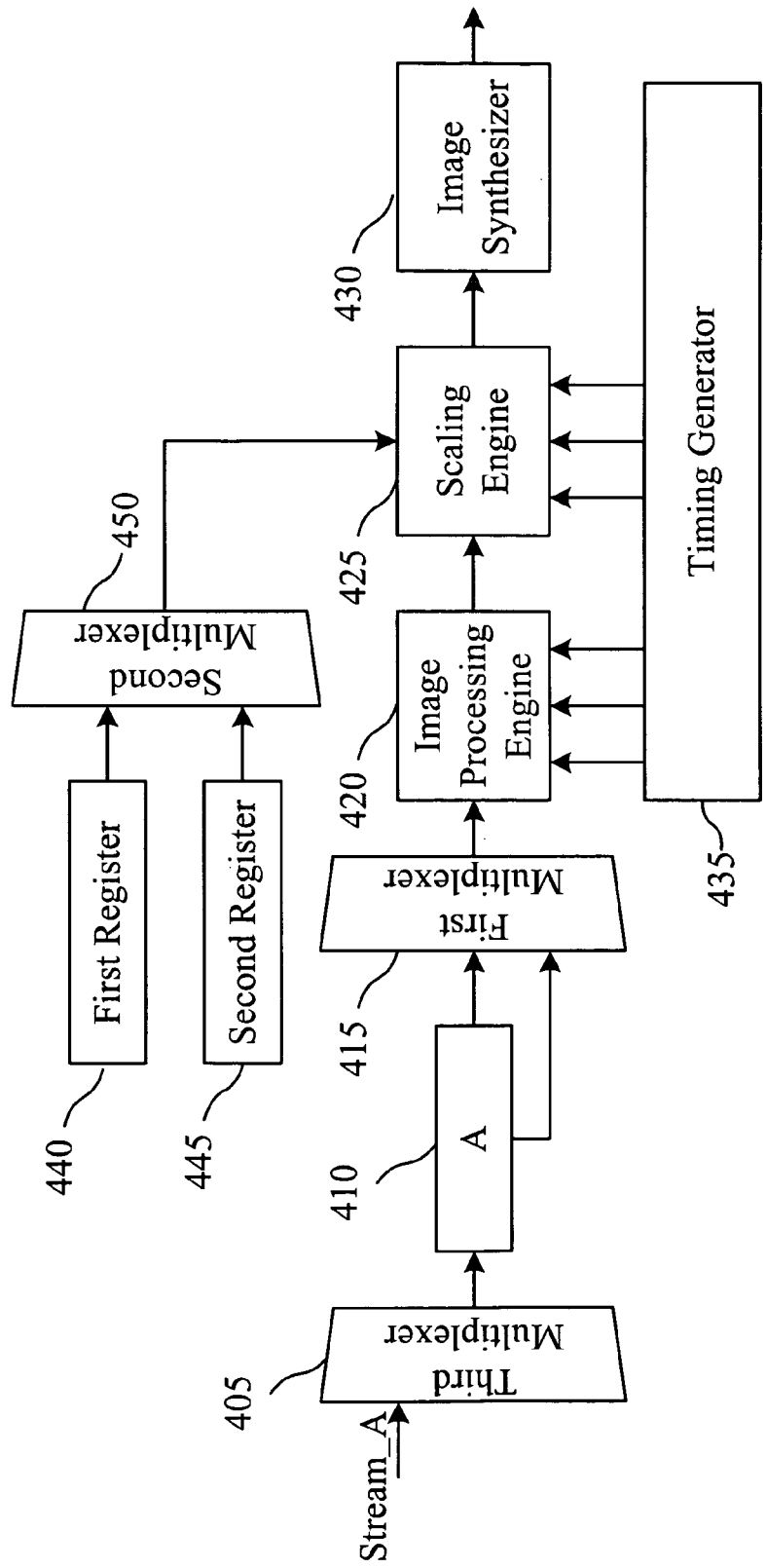
FIG. 5 is a block diagram of the system of FIG. 4 that does not apply the picture-out-picture capability in accordance with the invention.

FIG. 5 is a block diagram of the system of FIG. 4 that does not apply the picture-out-picture capability in accordance with the invention. In this case, the third multiplexer 405 only receives partial pixels of the first picture Stream_A, and the line buffer 410 is implemented only to store the partial pixels of the first picture Stream_A. As cited, when the system applies the POP capability, the third multiplexer 405 sends the partial pixels of the first and the second pictures Stream_A and Stream_B to the line buffer 410 in multiplexing, and the line buffer 410 is divided into two blocks 411, 412 to temporarily store the partial pixels of the first picture Stream_A and the partial pixels of the second picture Stream_B respectively. The line buffer 410 can be connected directly to the image processing engine 420 in order to perform an image processing on the partial pixels of the first or second picture Stream_A or Stream_B to thereby produce the corresponding processed pixels. Alternatively, the first multiplexer 415 can be implemented between the line buffer 410 and the image processing engine 420 in order to select the partial pixels of the first or second picture Stream_A or Stream_B as an output to the image processing engine 420.

The scaling engine 425 is connected to the image processing engine 420 in order to perform a scaling operation on the processed pixels corresponding to the partial pixels of the first or the second picture Stream_A or Stream_B to thereby produce the scaled pixels.

The image synthesizer 430 is connected to the scaling engine 425 in order to synthesize the scaled pixels to thereby produce an image signal with the POP video effect.

The timing generator 435 is connected to the first multiplexer 415, the image processing engine 420 and the scaling engine 425 in order to produce a timing signal for the image processing engine and the scaling engine and to produce enable signals respectively for the first picture Stream_A and the second picture Stream_B.

The image processing engine 420 and the scaling engine 425 depend on the timing signal produced by the timing generator 435 to process the partial pixels of the first or second picture Stream_A or Stream_B in multiplexing.

The first register 440 temporarily stores the settings of which are applied by the scaling engine 425 to perform the scaling operation on the processed pixels of the first picture Stream_A.

The second register 445 temporarily stores the settings of which are applied by the scaling engine 425 to perform the scaling operation on the processed pixels of the second picture Stream_B.

The second multiplexer 450 is connected to the first register 440, the second register 445 and the scaling engine 425 in order to provide the settings to the scaling engine on performing the scaling operation.

Figure 6:
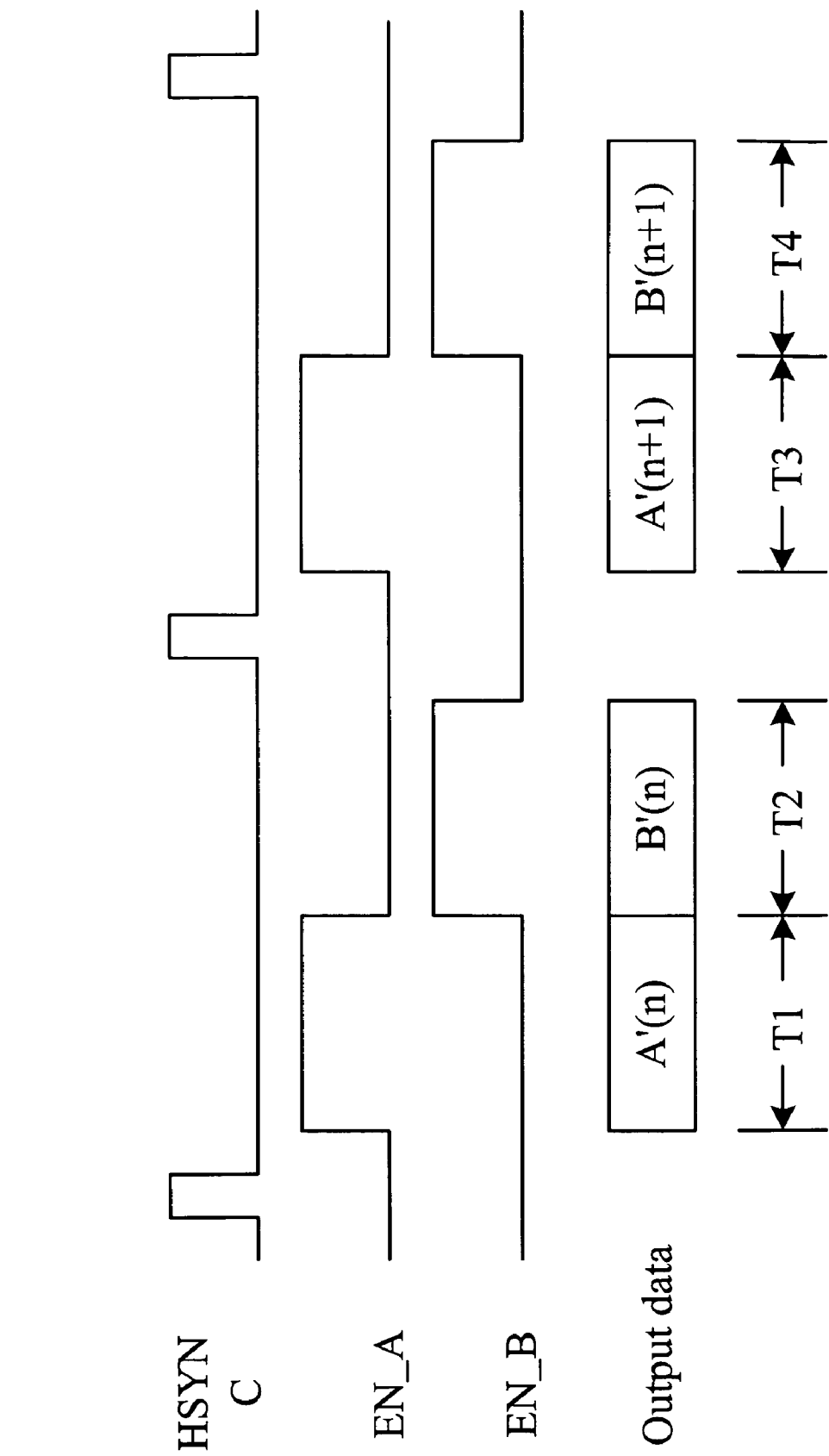
FIG. 6 is a schematic graph of timing and enable signals generated by a timing generator in accordance with the invention.

FIG. 6 is a schematic graph of the timing signal and the enable signals generated by the timing generator 435 in accordance with the invention, which is of a time sharing manner. As shown in FIG. 6, the timing signal HSYNC contains an image output line between two pulses, and each image output line has the enable signals EN_A and EN_B to control a data input of the image processing engine 420. When the signal EN_A is enabled, the image processing engine 420 receives partial data of the first picture Stream_A, performs the image processing on the received data, and outputs the processed data (of the first picture Stream_A). Similarly, when the signal EN_B is enabled, the image processing engine 420 receives partial data of the second picture Stream_B, performs the image processing on the received data, and outputs the processed data (of the second picture Stream_B).

When timing signal and the enable signal are produced for the first picture Stream_A, the timing generator 435 reads the data out of the line buffer 410 at the block 411. When timing signal and the enable signal are produced for the second picture Stream_B, the timing generator 435 reads the data out of the line buffer 410 at the block 412. As shown in FIG. 6, the data of the first and the second pictures are sent to the image processing engine 420 at different time, i.e., the enable signals EN_A and EN_B do not work concurrently.

When a time control signal for the first picture Stream_A is produced, the timing generator 435 reads the settings out of the first register 440 that is required for the image processing engine 420. When a time control signal for the second picture Stream_B is produced, the timing generator 435 reads the settings out of the second register 445 that is required for the image processing engine 420. In addition, the processed data is sequentially sent by the image processing engine 420 to the scaling engine 425.

Similarly, when the time control signal for the first picture Stream_A is produced, the timing generator 435 reads the settings out of the first register 440 that is required for the scaling engine 425. When the time control signal for the second picture Stream_B is produced, the timing generator 435 reads the settings out of the second register 445 that is required for the scaling engine 425. In addition, the scaled data is sequentially sent by the scaling engine 425 to the image synthesizer 430.

As shown in FIG. 6, the n-th line of data of the first picture Stream_A is output at time T1, the n-th line of data of the second picture Stream_B is output at time T2, the (n+1)-th line of data of the first picture Stream_A is output at time T3, the (n+1)-th line of data of the second picture Stream_B is output at time T4, and so on. When all image output lines are combined, the first picture Stream_A is on the left frame, and the second picture Stream_B is on the right frame, as same as the frames obtained by two sets of image processing hardware in the prior art.

As cited, the prior art requires two sets of image processing hardware for the POP capability. However, the invention uses only one set of image processing hardware plus a timing generator to achieve the POP capability, so as not to affect the frame rate on display. Further, with the use of only one set of image processing hardware, the cost can be significantly reduced.

Although the present invention has been explained in relation to its preferred embodiment, it is to be understood that many other possible modifications and variations can be made without departing from the spirit and scope of the invention as hereinafter claimed.

What is claimed is:

1. A system for processing a television picture-out-picture, comprising:

a multiplexer for receiving partial pixels of a first picture and partial pixels of a second picture and outputting the partial pixels of the first picture and the partial pixels of the second picture in multiplexing;

a line buffer connected to the multiplexer for receiving partial pixels of the first picture and partial pixels of the second picture for output;

an image processing engine connected to the line buffer for performing an image processing on the partial pixels output by the line buffer to produce processed pixels corresponding to the partial pixels of the first or second picture;

a scaling engine connected to the image processing engine for performing a scaling operation on the processed pixels to produce scaled pixels;

a timing generator connected to the image processing engine and the scaling engine for producing a timing signal for the image processing engine and the scaling engine and producing enable signals respectively for the first picture and the second picture;

an image synthesizer connected to the scaling engine for synthesizing the scaled pixels to produce an image signal with a POP video effect; and a first multiplexer, which is connected between the line buffer and the image processing engine and has two input terminals connected to the line buffer for selecting the partial pixels of the first or second picture as an output;

wherein when the timing generator generates the timing signal and the enable signal for the first picture in a first time interval, the image processing engine receives partial data of the first picture, performs the image processing on the received data, and outputs the processed data; and when the timing generator generates the timing signal and the enable signal for the second picture in a second time interval, the image processing engine receives partial data of the second picture, performs the image processing on the received data, and outputs the processed data.

2. The system as claimed in claim 1, further comprising:

a first register for temporarily storing settings of which are applied by the scaling engine to perform the scaling operation on the processed pixels of the first picture;

a second register for temporarily storing settings of which are applied by the scaling engine to perform the scaling operation on the processed pixels of the second picture; and a second multiplexer connected to the first register, the second register and the scaling engine for providing the settings to the scaling engine on performing the scaling operation.

3. The system as claimed in claim 1, wherein the line buffer has multiple blocks to temporarily store the partial pixels of the first picture and the partial pixels of the second picture respectively.

4. The system as claimed in claim 1, wherein the timing generator controls transfer of the partial pixels of the first picture and the partial pixels of the second picture to the image processing engine in a time sharing manner.

* * * * *